Sept. 30, 1930.  J. M. MURRAY  1,777,219

PISTON

Filed July 22, 1929

Inventor
James M. Murray
By Ritter & Ritter
his Attorneys

Patented Sept. 30, 1930

1,777,219

UNITED STATES PATENT OFFICE

JAMES M. MURRAY, OF CLEVELAND, OKLAHOMA

PISTON

Application filed July 22, 1929. Serial No. 380,152.

My invention relates to pistons for pumps and is designed to afford a construction which is especially suitable for incorporating in the so-called slush pumps that are used for circulating water through deep wells sunk by the rotary drilling process. The water thus circulated by slush pumps commonly carries grit, sand or other abrasive substances causing rapid wear and deterioration of the co-operating pump piston and cylinder; and it is, therefore, the general object of this invention to provide an efficiently operating pump piston which is adapted to operate upon the fluid containing abrasive materials without subjecting itself and the pump cylinder to excessive wear.

The principal feature of the invention consists in constructing the piston with a body member having a centrally disposed circumferential collar provided with beveled sealing faces, and in associating therewith a plurality of resilient packing rings which are positioned on opposite sides of the collar and are provided with inclined sealing faces for respectively co-operating with the beveled sealing faces of the collar, the packing rings being maintained in assembled relation to the body member by retaining plates secured to the latter, and means being provided for permitting the pressure of the fluid being pumped to be communicated to the inner circumference of the packing rings.

There are other features of the invention residing in advantageous forms and relations of parts, all as will hereinafter appear and be pointed out in the claims.

In the drawings illustrating a preferred form of the invention:

Figure 1:
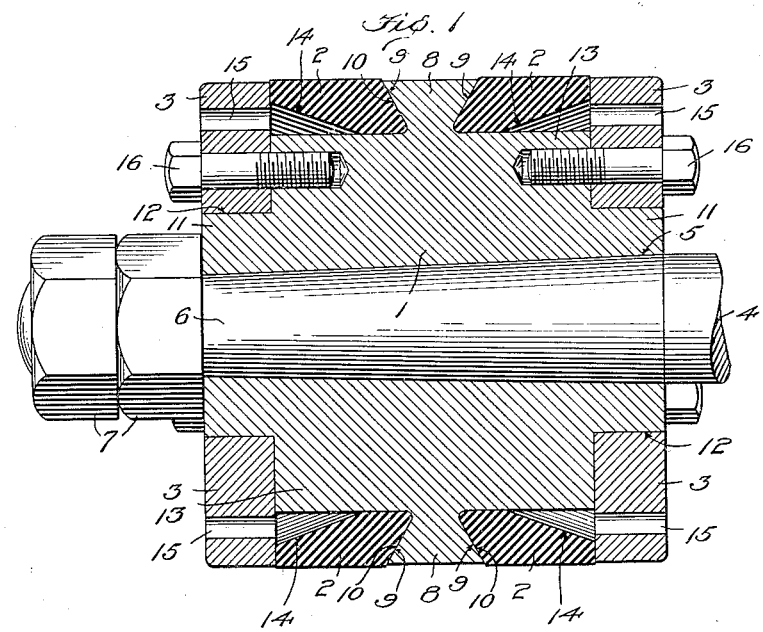
Figure 1 is a longitudinal sectional view of a piston constructed in accordance with the invention, a portion of a piston rod upon which it is mounted being also shown.
Figure 2:
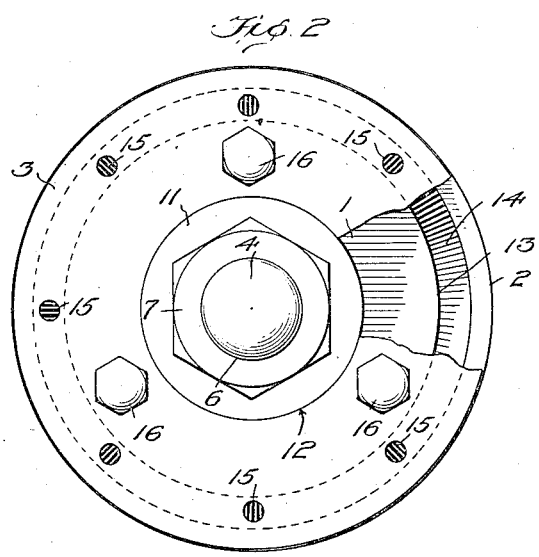
Figure 2 is a plan view of the construction shown in Fig. 1, a portion of one of the packing ring retaining plates being broken away.

In the drawings 1 indicates the body member of the piston upon which is mounted a plurality of resilient packing rings 2 which are maintained in assembled relation to the piston body by means of retaining plates 3. The piston body, which is a unitary member of any suitable metal, may be connected to the piston rod 4 in any desired manner. As shown in the drawings, this may be accomplished by forming the body with a tapering bore 5 for receiving the correspondingly tapered end portion 6 of the piston rod, nuts 7 being used to secure the piston on the rod.

The body member is integrally provided between its ends with an outwardly extending circumferential collar 8 having oppositely beveled faces 9 against which the correspondingly beveled faces 10 of the packing rings bear. At its opposite ends the body member 1 is preferably formed with bosses 11 which serve to center the retaining plates 3 by projecting into corresponding openings 12 in the latter. The portions 13 of the body member, which lie between the central collar 8 and the bosses 11, are preferably cylindrical.

The packing rings 2 may advantageously be formed as endless rubber rings. They are preferably of such size as to fit freely on the piston body and to fit freely into the cylinder. In addition to being provided with an inclined sealing face 10 for co-operating with the beveled sealing face 9 of the collar, the interior surface of each of the packing rings 2 is cupped or flared outwardly at its leading end, as indicated at 14. The faces of the packing rings at the ends adjacent the respective retaining plates 3 are preferably flat surfaces lying in planes normal to the axis of the piston body 1, and the under side of each of the retaining plates is correspondingly shaped. Any tendency of the retaining plates to induce pressure between the packing rings and the cylinder walls on a return or suction stroke of the piston is thus avoided.

Suitable means are provided for enabling the fluid that is being operated upon to enter the spaces between the portions 13 of the piston body and the cupped or flared ends 14 of the packing rings. That is preferably accomplished by providing each of the retaining plates 3 with a series of circularly arranged holes 15 which permit the fluid to act upon the inner surface of the packings. The retaining plates 3 may be conveniently secured in assembled relation to the piston body 1 by means of screws 16.

It will be readily understood that upon movement of the piston in either direction the fluid being pumped exerts a pressure upon the inner surface of one of the packing rings 2, thus causing it to seat firmly against the inclined sealing face 9 of the collar 8 and also to expand outwardly at its leading end so as to pack properly against the cylinder walls. During this movement of the piston the other packing ring, whose inner surface is then subjected to suction, is relieved from pressure against the cylinder walls, thus avoiding friction between its parts. These actions of the packing rings occur alternately, during the reciprocations of the piston.

A piston constructed in accordance with this invention is simple in construction and may be easily assembled. The parts are so formed and related that the plates for retaining the packing rings in assembled relation are not required to withstand undue pumping strains; the packing rings are adapted to expand uniformly around their entire circumference, thus preventing the metal of the piston body from engaging the metal cylinder walls and also enabling the packing to conform to rough, uneven or scarred places in the cylinder walls; and the piston balance in the cylinder and with respect to the piston rod is promoted by causing substantially all the pumping strains to be communicated to the central collar of the piston body.

I claim:

1. A pump piston involving a body member provided with a circumferential collar projecting radially between its ends, a plurality of resilient packing rings between which said collar is interposed, and a plurality of retaining plates rigidly connected to said body member for respectively maintaining the packing rings in assembled relation, each of said rings being cupped at its leading end to form a cavity between it and said body member for admitting the fluid operated upon by the piston, said rings and said collar being formed with co-operating inclined faces which are adapted to be forced together by the pressure of the liquid pumped, and said retaining plates being adapted to permit the fluid operated upon to enter the cavities between said rings and said body member.

2. A pump piston involving a body member provided between its ends with a laterally extending circumferential collar formed on opposite sides with beveled faces which diverge radially outward, said body member being formed with bosses at its opposite ends, a plurality of resilient packing rings each having a beveled face for engaging the adjacent beveled face of said collar and each being cupped at its leading end to form a cavity between it and said body member, and a plurality of plates respectively overlapping said rings for retaining the latter in assembled relation, said plates being provided with openings for respectively receiving said bosses and being formed with openings for permitting the liquid upon which the piston operates to enter the spaces between said cupped ends of the packings and the adjacent portions of the body member.

3. A pump piston involving an integral body member formed with bosses at its opposite ends and provided between its ends with a laterally projecting circumferential collar, said collar having oppositely disposed outwardly divergent sealing faces, a plurality of resilient packing rings between which said collar is interposed, each of said rings being interiorly cupped at its leading end to form a cavity between it and said body member and being provided with a beveled sealing surface for co-operating with the neighboring sealing face of the collar, a plurality of plates for respectively retaining said rings in assembled relation, and means for securing said plates to the body member, each of said rings being provided at its leading end with a circumferential shoulder forming an angle with the adjacent cupped surface of the ring and which is overlapped by the said plate adjacent thereto, said plates being respectively provided with openings for receiving the said bosses, and each of said plates being apertured to admit fluid pressure to the interior of the cupped portion of the adjacent packing ring.

4. A pump piston involving an integral body member provided between its ends with a laterally projecting circumferential collar, a plurality of resilient packing rings between which the collar is interposed, said collar having oppositely disposed outwardly divergent beveled sealing faces, each of said rings being interiorly cupped at its leading end to form a cavity between it and the adjacent portion of said body member and having a beveled sealing face for co-operating with the adjacent beveled face of the collar, a plurality of plates engaging said body member and respectively overlapping said rings for retaining the latter in assembled relation, and means for securing said plates to the body member, each of said plates being provided with a plurality of holes in alignment with the cupped interior of the respectively adjacent packing rings.

In testimony whereof I affix my signature.

JAMES M. MURRAY.